(12) United States Patent
Liu et al.

(10) Patent No.: US 9,998,005 B2
(45) Date of Patent: Jun. 12, 2018

(54) SINGLE INDUCTOR DUAL OUTPUT VOLTAGE CONVERTER AND THE METHOD THEREOF

(71) Applicant: Monolithic Power Systems, Inc., San Jose, CA (US)

(72) Inventors: Bairen Liu, Hangzhou (CN); Licheng Sheng, Hangzhou (CN); Bo Yu, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 3 days.

(21) Appl. No.: 15/474,988

(22) Filed: Mar. 30, 2017

(65) Prior Publication Data

US 2017/0324323 A1 Nov. 9, 2017

(30) Foreign Application Priority Data

May 5, 2016 (CN) .......................... 2016 1 0289323

(51) Int. Cl.
| | |
|---|---|
| *H02J 3/12* | (2006.01) |
| *G05F 1/00* | (2006.01) |
| *H02M 3/157* | (2006.01) |
| *H02M 1/08* | (2006.01) |
| *H02M 3/158* | (2006.01) |
| *H02M 1/00* | (2006.01) |

(52) U.S. Cl.
CPC ............. *H02M 3/157* (2013.01); *H02M 1/08* (2013.01); *H02M 3/158* (2013.01); *H02M 2001/009* (2013.01); *H02M 2001/0009* (2013.01)

(58) Field of Classification Search
CPC . H02M 3/1582; H02M 3/1584; H02M 3/1586
USPC ................ 323/241, 243, 267, 274, 283, 284
See application file for complete search history.

(56) References Cited

U.S. PATENT DOCUMENTS

| | | | |
|---|---|---|---|
| 2008/0055946 A1* | 3/2008 | Lesso ..................... | H02M 3/158 363/63 |
| 2011/0227493 A1 | 9/2011 | Du et al. | |
| 2012/0062030 A1* | 3/2012 | Xu ....................... | H02M 3/1582 307/31 |
| 2012/0105043 A1* | 5/2012 | Wilson .................. | H02M 3/158 323/304 |
| 2012/0194078 A1 | 8/2012 | Ren et al. | |
| 2013/0193943 A1* | 8/2013 | Wilson ................ | H02M 3/1582 323/284 |
| 2014/0225577 A1* | 8/2014 | Ivanov ................ | H02M 3/1582 323/225 |

(Continued)

*Primary Examiner* — Gary Nash
(74) *Attorney, Agent, or Firm* — Perkins Coie LLP (57) ABSTRACT

A voltage converter provides a positive voltage and a negative voltage with a single inductor. The voltage converter has a first switch, a second switch, a third switch and a fourth switch switched periodically, wherein each switching period comprise a first time period, a second time period and a third time period, and wherein: during the first time period, the first switch and the fourth switch are turned on, whereas the second switch and the third switch are turned off; during the second time period, the first switch and the third switch are turned on, whereas the second switch and the fourth switch are turned off; and during the third time period, the second switch and the fourth switch are turned on, whereas the first switch and the third switch are turned off.

19 Claims, 4 Drawing Sheets

(56) References Cited

U.S. PATENT DOCUMENTS

2014/0246908 A1* 9/2014 Chew .................. H02M 3/156
                                                         307/24
2015/0188434 A1   7/2015 Ouyang
2015/0208472 A1   7/2015 Liu et al.
2016/0150608 A1   5/2016 Kuang et al.

* cited by examiner

SINGLE INDUCTOR DUAL OUTPUT VOLTAGE CONVERTER AND THE METHOD THEREOF

CROSS-REFERENCE TO RELATED APPLICATIONS

This application claims priority to and the benefit of Chinese Patent Application No. 201610289323.6, filed on May 5, 2016, which is incorporated herein by reference in its entirety.

FIELD

The present invention relates generally to electronic circuits, and more particularly but not exclusively to single-inductor voltage converter with dual-output and the method thereof.

BACKGROUND

Voltage converters, comprising buck converter, boost converter and buck-boost converter, are widely adopted to convert an input voltage to a desired output voltage in a power management system. In real application, a boost converter or a buck converter is usually adopted to provide a positive output voltage, and a buck-boost converter is usually adopted to provide a negative output voltage. In an application both the positive voltage and the negative voltage are needed, a combination of the boost/buck converter and the buck-boost converter are adopted.

However, the conventional combination of the buck/boost converter and the buck-boost converter is merely an integration of two independent voltage converters, and needs two inductors, which results in large size and high cost.

SUMMARY

It is an object of the present invention to disclose a voltage converter providing a positive voltage and a negative voltage with a single inductor.

In accomplishing the above and other objects, there has been provided, in accordance with an embodiment of the present invention, a voltage converter having an inductor, an input port receiving an input voltage, a first output port providing a first output voltage, and a second output port providing a second output voltage, comprising: a first switch, coupled between the input port and a first terminal of the inductor; a second switch, coupled between the first terminal of the inductor and the second output port; a third switch, coupled between the second terminal of the inductor and the first output port; and a fourth switch, coupled between the second terminal of the inductor and a ground reference; wherein the first switch, the second switch, the third switch and the fourth switch are switched periodically during operation, and each switching period comprises a first time period, a second time period and a third time period, and wherein: during the first time period, the first switch and the fourth switch are turned on, whereas the second switch and the third switch are turned off; during the second time period, the first switch and the third switch are turned on, whereas the second switch and the fourth switch are turned off; and during the third time period, the second switch and the fourth switch are turned on, whereas the first switch and the third switch are turned off.

In accomplishing the above and other objects, there has been provided, in accordance with an embodiment of the present invention, a control circuit for a voltage converter having an inductor, an input port configured to receive an input voltage, a first output port configured to provide a first output voltage, a second output port configured to provide a second output voltage, a first switch coupled between the input port and a first terminal of the inductor, a second switch coupled between the first terminal of the inductor and a second output port, a third switch coupled between a second terminal of the inductor and a first output port, a fourth switch coupled between the second terminal of the inductor and a ground reference, the control circuit comprising: a first duty cycle regulating circuit, configured to provide a first duty cycle control signal based on a first reference signal, the first output voltage and a comparison reference signal; a second duty cycle regulating circuit, configured to provide a second duty cycle control signal based on a second reference signal, the comparison reference signal and an absolute signal which has an absolute value of the second output voltage; and a logic circuit, configured to provide a first control signal, a second control signal, a third control signal and a fourth control signal based on a logic operation on the first duty cycle control signal and the second duty cycle control signal.

In accomplishing the above and other objects, there has been provided, in accordance with an embodiment of the present invention, a method for controlling a voltage converter having an inductor, an input port configured to receive an input voltage, a first output port configured to provide a first output voltage, a second output port configured to provide a second output voltage, a first switch coupled between the input port and a first terminal of the inductor, a second switch coupled between the first terminal of the inductor and a second output port, a third switch coupled between a second terminal of the inductor and a first output port, a fourth switch coupled between the second terminal of the inductor and a ground reference, the method comprising: turning on the first switch and the fourth switch, and turning off the second switch and third switch during a first time period; turning on the first switch and the third switch, and turning off the second switch and the fourth switch during a second time period, and turning on the second switch and the fourth switch, and turning off the first switch and the third switch during a third time period; wherein the first time period, the second time period and the third time period constitute sequently each switching period of the voltage converter.

In the embodiments of the present invention, the voltage converter provides a positive voltage and a negative voltage with a single inductor. Furthermore, the positive voltage and the negative voltage are independent to each other and could be regulated independently. Compared to prior art, the voltage converter provided by the present invention has lower cost and smaller size.

BRIEF DESCRIPTION OF THE DRAWINGS

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
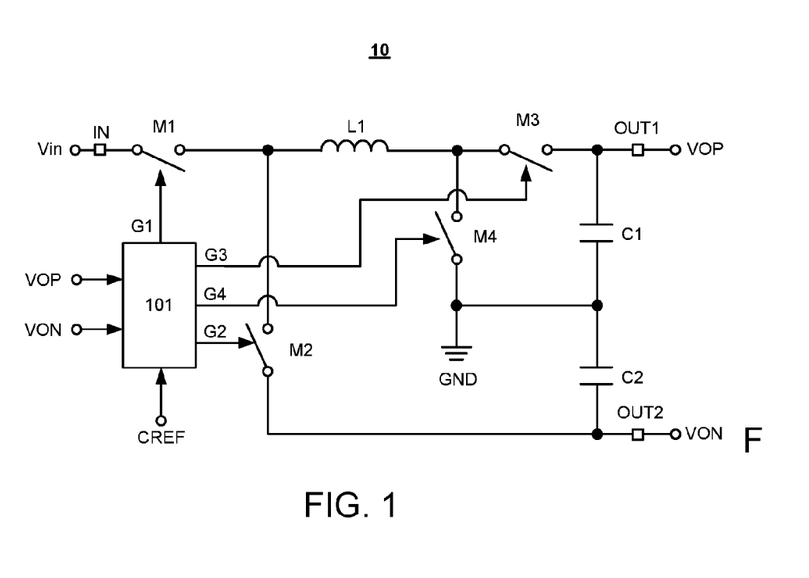
FIG. 1 schematically shows a voltage converter 10 in accordance with an embodiment of the present invention.

FIG. 1 schematically shows a voltage converter 10 in accordance with an embodiment of the present invention. As shown in FIG. 1, the voltage converter 10 comprises: an input port IN configured to receive an input voltage Vin, a first output port OUT1 configured to provide a first output voltage VOP; a second output port OUT2 configured to provide a second output voltage VON; an inductor L1 having a first terminal and a second terminal; a first switch M1, coupled between the input port IN and the first terminal of the inductor L1; a second switch M2, coupled between the first terminal of the inductor L1 and the second output port OUT2, wherein the second switch M2 and the first switch M1 are alternately turned on and off; a third switch M3, coupled between the second terminal of the inductor L1 and the first output port OUT1, and a fourth switch M4, coupled between the second terminal of the inductor L1 and a ground reference GND, wherein the fourth switch M4 and the third switch M3 are alternately turned on and off; wherein the switches M1-M4 are switched periodically during operation, and each switching period comprises a first time period T1, a second time period T2 and a third time period T3, and wherein: during the first time period T1, the first switch M1 and the fourth switch M4 are turned on, whereas the second switch M2 and the third switch M3 are turned off; during the second time period T2, the first switch M1 and the third switch M3 are turned on, whereas the second switch M2 and the fourth switch M4 are turned off; and during the third time period T3, the second switch M2 and the fourth switch M4 are turned on, whereas the first switch M1 and the third switch M3 are turned off.

Persons of ordinary skill in the art should know that in some applications, dead time may be inserted between the successive time periods T1~T3.

In FIG. 1, output capacitors C1 and C2 are coupled in series between the first output port OUT1 and the second output port OUT2, and a connection node of the output capacitors C1 and C2 is connected to the ground reference GND.

In the example of FIG. 1, the switches M1~M4 comprise controllable transistors. The voltage converter 10 further comprises a control circuit 101 configured to provide control signals G1~G4 to respectively control the switches M1~M4.

In some embodiments, the first switch M1 and the fourth switch M4 are controllable transistors, whereas the second switch M2 and the third switch M3 are diodes. Persons of ordinary skill in the art should know that when the second switch M2 and the third switch M3 are diodes, the control circuit 101 only provides control signals G1 and G4 to respectively control the first switch M1 and the fourth switch M4.

Persons of ordinary skill in the art should know that the controllable transistor mentioned before may comprise MOSFET (Metal Oxide Semiconductor Field Effect Transistor), JFET (Junction Field Effect Transistor) or BJT (Bipolar Junction Transistor).

Figure 2:
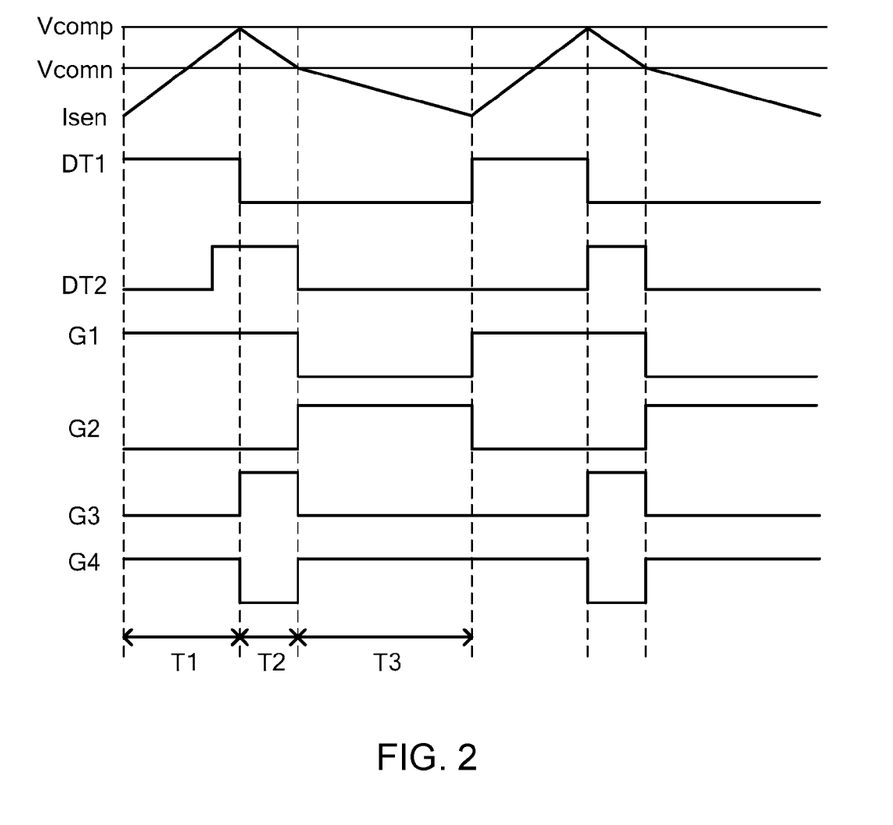
FIG. 2 shows waveforms of the control signals G1~G4 and a current sense signal Isen representing a current flowing through the inductor L1.

FIG. 2 shows waveforms of the control signals G1~G4, duty cycle control signals DT1~DT2, and a current sense signal Isen representing a current flowing through the inductor L1. Signal DT1 is the duty cycle control signal for controlling the switches M1 and M4, which is also referred as a first duty cycle control signal; signal DT2 is the duty cycle control signal for controlling the switches M2 and M3, which is also referred as a second duty cycle control signal. The control signals G1~G4 are generated based on the first duty cycle control signal DT1 and the second duty cycle control signal DT2.

The operation of the voltage converter 10 is described with reference to FIGS. 1 and 2. As mentioned before, each switching period comprises the first time period T1, the second time period T2 and the third time period T3. During the first time period T1, the first duty cycle control signal DT1 is valid. Accordingly, the first control signal G1 and the fourth control signal G4 are valid too. Thus, the first switch M1 and the fourth switch M4 are turned on, whereas the second switch M2 and the third switch M3 are turned off. As a result, the inductor L1 is coupled to the input voltage Vin to be charged, and the current sense signal Isen indicative of the current flowing through the inductor L1 increases. During the second time period T2, the second duty cycle control signal DT2 is valid. Accordingly, the first control signal G1 and the third control signal G3 are valid. Thus, the first switch M1 and the third switch M3 are turned on, whereas the second switch M2 and the fourth switch M4 are turned off. As a result, the first output capacitor C1 is charged, and the voltage converter 10 works under a boost mode. During the third time period T3, the second control signal G2 and the fourth control signal G4 are valid. Thus, the second switch M2 and the fourth switch M4 are tuned on, whereas the first switch M1 and the third switch M3 are turned off. As a result, the second output capacitor C2 is charged, and the voltage converter 10 works under a buck-boost mode. The voltage converter 10 works under the boost mode during the first time period T1 and the second time period T2, and works under the buck-boost mode during the first time period T1 and the third time period T3. As a result, the first output port OUT1 provides a first output voltage VOP which has a positive value and the second output port OUT2 provides a second output voltage VON which has a negative value. The value of the first output voltage VOP and the value of the second output voltage VON could be regulated by adjusting lengths of the time periods T1-T3.

In some embodiments, a signal is valid when it has a high voltage level. In other embodiments, the contrary is the case. Persons of ordinary skill in the art could set the proper value for a signal as a valid state according to the applications.

Figure 3:
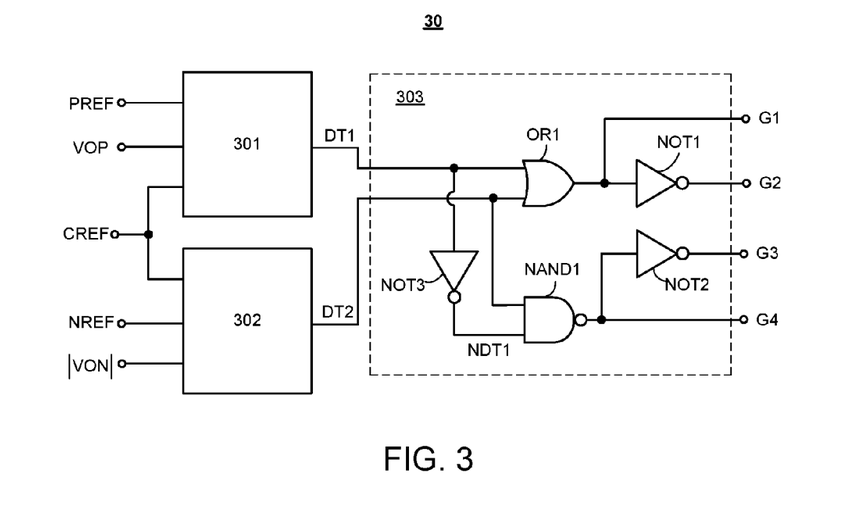
FIG. 3 schematically shows a control circuit 30 in accordance with an embodiment of the present invention.

FIG. 3 schematically shows a control circuit 30 in accordance with an embodiment of the present invention. As shown in FIG. 3, the control circuit 30 comprises: a first duty cycle regulating circuit 301, having a first input terminal configured to receive a first reference signal PREF, a second input terminal configured to receive the first output voltage VOP, a third input terminal configured to receive a comparison reference signal CREF, and an output terminal configured to provide the first duty cycle control signal DT1 based on the first reference signal PREF, the first output voltage VOP and the comparison reference signal CREF; a second duty cycle regulating circuit 302, having a first input terminal configured to receive a second reference signal NREF, a second input terminal configured to receive an absolute signal |VON| which has an absolute value of the second output voltage VON, a third input terminal configured to receive the comparison reference signal CREF, and an output terminal configured to provide the second duty cycle control signal DT2 based on the second reference signal NREF, the absolute signal |VON| and the comparison reference signal CREF; and a logic circuit 303 having a first input terminal configured to receive the first duty cycle control signal DT1, a second input terminal configured to receive the second duty cycle control signal DT2, and a first output terminal, a second output terminal, a third output terminal and a fourth output terminal configured to provide respectively the first control signal G1, the second control signal G2, the third control signal G3 and the fourth control signal G4 based on a logic operation on the first duty cycle control signal DT1 and the second duty cycle control signal DT2.

In the example of FIG. 3, the logic circuit 303 comprises: a logic OR circuit OR1, configured to receive the first duty cycle control signal DT1 and the second duty cycle control signal DT2, and to provide the first control signal G1 based on an OR operation on the first duty cycle control signal DT1 and the second duty cycle control signal DT2; a logic NAND circuit NAND1, configured to receive an inverting signal NDT1 which has an opposite phase to the first duty cycle control signal DT1, and the second duty cycle control signal DT2, and to provide the fourth control signal G4 based on an NAND operation on the inverting signal NDT1 and the second duty cycle control signal DT2; a first inverting circuit NOT1, configured to receive the first control signal G1, and to provide the second control signal G2 based on the first control signal G1, wherein the second control signal G2 has an opposite phase to the first control signal G1; and a second inverting circuit NOT2, configured to receive the fourth control signal G4, and to provide the third control signal G3 based on the fourth control signal G4, wherein the third control signal G3 has an opposite phase to the fourth control signal G4.

In one embodiment, the inverting signal NDT1 is generated by a third inverting circuit NOT3 based on the first duty cycle control signal DT1.

As mentioned above, when the second switch M2 and the third switch M3 comprise diodes, the second control signal G2 and the third control signal G3 could be omitted. In that case, the logic circuit 303 provides only the first control signal G1 and the fourth control signal G4, and the first inverter NOT1 and the second inverter NOT2 could be saved.

The logic circuit 303 may have other structures. With the logic relation between the control signals G1~G4 and the duty cycle control signals DT1 and DT2 described before, persons of ordinary skill in the art could generate the logic circuit in multiple ways, for example, persons of ordinary skill in the art could generate the logic circuit by hardware description language, e.g., Verilog, VHDL (Very-High-Speed Integrated Circuit Hardware Description Language). The variety of the logic circuit 303 is not described here for brevity.

Well-known control methods, such as PWM (Pulse width Modulation), PFM (Pulse Frequency Modulation), off time control, may be utilized in the first duty cycle regulating circuit 301 and the second duty cycle regulating circuit 302.

Figure 4:
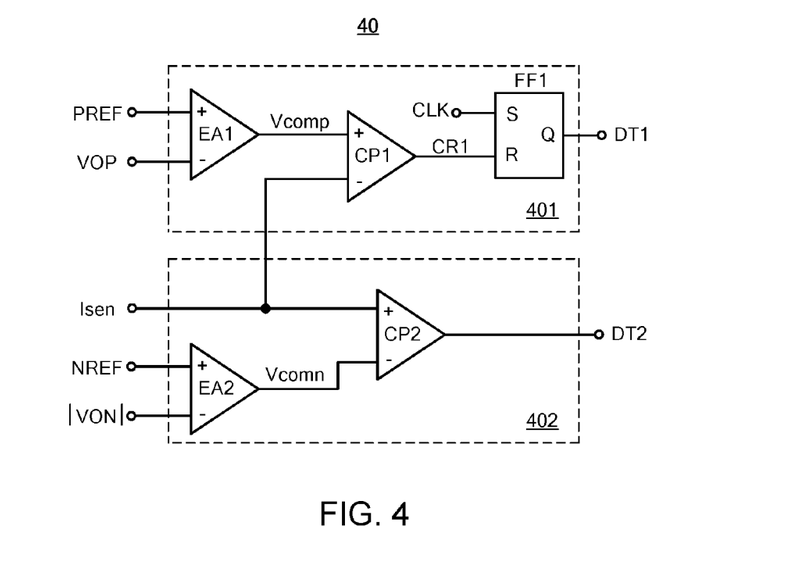
FIG. 4 schematically shows a peak current controlled PWM circuit 40 in accordance with an embodiment of the present invention.

FIG. 4 schematically shows a control circuit 40 with peak current PWM control in accordance with an embodiment of the present invention. The control circuit 40 introduces the current sense signal Isen as the comparison reference signal. The control circuit 40 comprises a first duty cycle regulating circuit 401 and a second duty cycle regulating circuit 402. As shown in FIG. 4, the first duty cycle regulating circuit 401 comprises: a first error amplifier EA1, having a first input terminal (non-inverting input terminal) configured to receive the first reference signal PREF, a second input terminal (inverting input terminal) configured to receive the first output voltage VOP, and an output terminal configured to provide a first error amplified signal Vcomp based on the first reference signal PREF and the first output voltage VOP; a first comparing circuit CP1 having a first input terminal (non-inverting input terminal) coupled to the output terminal of the first error amplifier EA1 to receive the first error amplified signal Vcomp, a second input terminal (inverting input terminal) configured to receive the current sense signal Isen indicative of the current flowing through the inductor L1, and an output terminal configured to provide a comparison signal CR1 based on the comparison of the current sense signal Isen and the first error amplified signal Vcomp; and a flip-flop FF1 having a set terminal "S" configured to receive a clock signal CLK, a reset terminal "R" coupled to the output terminal of the first comparing circuit CP1 to receive the comparison signal CR1, and an output terminal "Q" configured to provide the first duty cycle control signal DT1 based on the clock signal CLK and the comparison signal CR1, wherein the flip-flop FF1 is set by the clock signal CLK, and is reset by the comparison signal CR1. The second duty cycle regulating circuit 402 comprises: a second error amplifier EA2, having a first input terminal (non-inverting input terminal) configured to receive the second reference signal NREF, a second input terminal (inverting input terminal) configured to receive the absolute signal |VON|, and an output terminal configured to provide a second error amplified signal Vcomn based on the second reference signal NREF and the absolute signal |VON|; and a second comparing circuit CP2, having a first input terminal (non-inverting input terminal) coupled to the output terminal of the second error amplifier EA2 to receive the second error amplified signal Vcomn, a second input terminal (inverting input terminal) configured to receive the current sense signal Isen, and an output terminal configured to provide the second duty cycle control signal DT2 based on the comparison of the current sense signal Isen and the second error amplified signal Vcomn. The waveforms of the first duty cycle control signal DT1 and the second duty cycle control signal DT2 are shown in FIG. 2.

In the example of FIG. 4, the current sense signal Isen is adopted as the comparison reference signal CREF. It is common sense to compensate the current sense signal Isen indicative of the current flowing through the inductor in order to make the whole system steady. So the current sense signal Isen could represent a current sense signal with or without compensation, depending on the applications.

In one embodiment, the first duty cycle control signal 401 further comprises a clock circuit (not shown in FIG. 4) configured to generate the clock signal CLK.

In one embodiment, as shown in FIG. 2, at the beginning of the first time period T1, a pulse of the clock signal CLK sets the flip-flop FF1. As a result, the first duty cycle control signal DT1 becomes high voltage level. Then the first control signal G1 and the fourth control signal G4 become high voltage level, and the first switch M1 and the fourth switch M4 are turned on. Thereby the current sense signal Isen increases. When the current sense signal Isen reaches the first error amplified signal Vcomp, the first comparing circuit CP1 flips, and the comparison signal CR1 resets the flip-flop FF1. As a result, the first duty cycle control signal DT1 becomes low voltage level, and the first time period T1 is over. At the end of the first time period T1, the current sense signal Isen is larger than the second error amplified signal Vcomn, and the second comparing circuit CP2 provides the second duty cycle control signal DT2 with high voltage level. Thus at the beginning of the second time period T2, the first control signal G1 and the third control signal G3 become high voltage level. As a result, the first switch M1 and the third switch M3 are turned on, and the inductor L1 charges the capacitor C1, which makes the current sense signal Isen decrease. When the current sense signal Isen decreases to the second error amplified signal Vcomn, the second comparator CP2 flips and the second duty cycle control signal DT2 becomes low voltage level. Then the second time period T2 ends and the third time period T3 begins. During the third time period T3, the second control signal G2 and the fourth control signal G4 become high voltage level, and the second switch M2 and the fourth switch M4 are turned on. As a result, the inductor L1 charges the capacitor C2, which makes the current sense signal Isen decrease. The third time period T3 ends till a next pulse of the clock signal CLK arrives, which starts a new switching period.

Persons of ordinary skill in the art should know that partial signals of the first output voltage VOP, the absolute signal |VON| instead of the original signals may be adopted to meet the input range requirement of the error amplifiers EA1 and EA2 in some embodiments.

The control circuit with peak current PWM control may have structures other than the circuit in FIG. 4. Furthermore, the waveform of the second duty cycle control signal DT2 could be different in other embodiments as long as the switches M1~M4 could be operated as described before.

Figure 5:
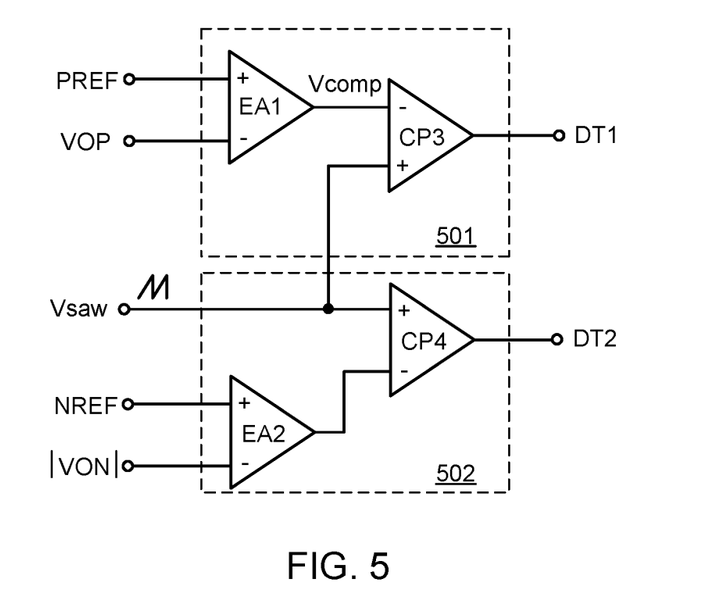
FIG. 5 schematically shows a voltage controlled PWM circuit 50 in accordance with an embodiment of the present invention.

FIG. 5 schematically shows a control circuit 50 with voltage PWM control in accordance with an embodiment of the present invention. The control circuit 50 introduces a sawtooth signal Vsaw as the comparison reference signal CREF. The control circuit 50 comprises a first duty cycle regulating circuit 501 and a second duty cycle regulating circuit 502. As shown in FIG. 5, the first duty cycle regulating circuit 501 comprises: a first error amplifier EA1, having a first input terminal (non-inverting input terminal) configured to receive the first reference signal PREF, a second input terminal (inverting input terminal) configured to receive the first output voltage VOP, and an output terminal configured to provide the first error amplified signal Vcomp based on the first reference signal PREF and the first output voltage VOP; a third comparing circuit CP3, having a first input terminal (inverting input terminal) coupled to the output terminal of the first error amplifier EA1 to receive the first error amplified signal Vcomp, a second input terminal (non-inverting input terminal) configured to receive the sawtooth signal Vsaw, and an output terminal configured to provide the first duty cycle control signal DT1 based on the comparison of the first error amplified signal Vcomp and the sawtooth signal Vsaw. The second duty cycle regulating circuit 502 comprises: the second error amplifier EA2, having a first input terminal (non-inverting input terminal) configured to receive the second reference signal NREF, a second input terminal (inverting input terminal) configured to receive the absolute signal |VON|, and an output terminal configured to provide the second error amplified signal Vcomn based on the second reference signal NREF and the absolute signal |VON|; and a fourth comparing circuit CP4, having a first input terminal (non-inverting input terminal) configured to receive the sawtooth signal Vsaw, a second input terminal (inverting input terminal) coupled to the output terminal of the second error amplifier EA2 to receive the second error amplified signal Vcomn, and an output terminal configured to provide the second duty cycle control signal DT2 based on the comparison of the sawtooth signal Vsaw and the second error amplified signal Vcomn.

In one embodiment, the voltage controlled PWM circuit 50 further comprises a sawtooth generator configured to provide the sawtooth signal Vsaw.

The operation of the control circuit 50 is similar to the operation of the control circuit 40, and is not described here for brevity.

Figure 6:
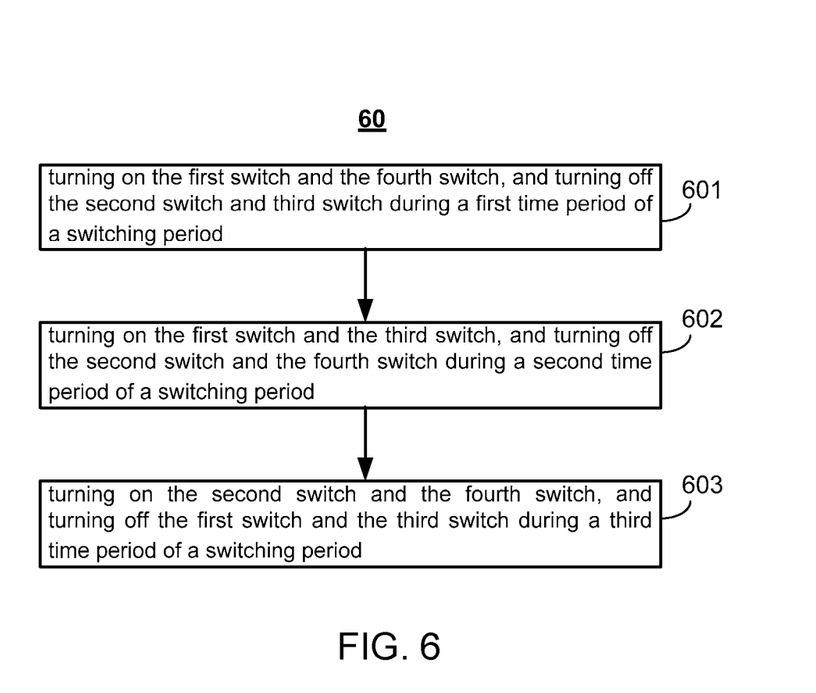
FIG. 6 shows a method 60 for controlling a voltage converter in accordance with an embodiment of the present invention.

FIG. 6 shows a method 60 for controlling a voltage converter in accordance with an embodiment of the present invention. The voltage converter has an input port configured to receive an input voltage, a first output port configured to provide a first output voltage, and a second output port configured to provide a second output voltage. The voltage converter may comprise an inductor, a first switch coupled between the input port and a first terminal of the inductor, a second switch coupled between the first terminal of the inductor and the second output port, a third switch coupled between a second terminal of the inductor and the first output port, and a fourth switch coupled between the second terminal of the inductor and a ground reference. The switches are switched periodically during operation, thus the voltage converter has switching periods. The method 60 comprises: step 601, turning on the first switch and the fourth switch, and turning off the second switch and third switch during a first time period; step 602, turning on the first switch and the third switch, and turning off the second switch and the fourth switch during a second time period, and step 603, turning on the second switch and the fourth switch, and turning off the first switch and the third switch during a third time period; wherein the first time period, the second time period and the third time period constitute sequently each switching period of the voltage converter.

In some embodiments, the method 60 further comprises: generating a first duty cycle control signal based on the first output voltage, a first reference signal and a current sense signal indicative of a current flowing through the inductor; generating a second duty cycle control signal based on the second output voltage, a second reference signal and the current sense signal; and controlling lengths of the first time period, the second time period and the third time period based on a logic operation on the first duty cycle control signal and the second duty cycle control signal.

In some embodiments, the method 60 further comprises: generating a first duty cycle control signal based on the first output voltage, a first reference signal and a sawtooth signal; generating a second duty cycle control signal based on the second output voltage, a second reference signal and the sawtooth signal; and controlling lengths of the first time period, the second time period and the third time period based on a logic operation on the first duty cycle control signal and the second duty cycle control signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A voltage converter having an inductor, an input port receiving an input voltage, a first output port providing a first output voltage, and a second output port providing a second output voltage, comprising:
    a first switch, coupled between the input port and a first terminal of the inductor;
    a second switch, coupled between the first terminal of the inductor and a second output port;
    a third switch, coupled between the second terminal of the inductor and the first output port; and
    a fourth switch, coupled between the second terminal of the inductor and a ground reference; wherein
        the first switch, the second switch, the third switch and the fourth switch are switched periodically during operation, and each switching period comprises a first time period, a second time period and a third time period in a consecutive order, and wherein:
        during the first time period, the first switch and the fourth switch are turned on, whereas the second switch and the third switch are turned off;
        during the second time period, the first switch and the third switch are turned on, whereas the second switch and the fourth switch are turned off; and
        during the third time period, the second switch and the fourth switch are turned on, whereas the first switch and the third switch are turned off.

2. The voltage converter of claim 1, further comprising a control circuit having:
    a first duty cycle regulating circuit, having a first input terminal configured to receive a first reference signal, a second input terminal configured to receive the first output voltage, a third input terminal configured to receive a comparison reference signal and an output terminal configured to provide a first duty cycle control signal based on the first reference signal, the first output voltage and the comparison reference signal;
    a second duty cycle regulating circuit, having a first input terminal configured to receive a second reference signal, a second input terminal configured to receive an absolute signal which has an absolute value of the second output voltage, a third input terminal configured to receive the comparison reference signal, and an output terminal configured to provide a second duty cycle control signal based on the second reference signal, the absolute signal and the comparison reference signal; and
    a logic circuit, having a first input terminal configured to receive the first duty cycle control signal, a second input terminal configured to receive the second duty cycle control signal, and a first output terminal, a second output terminal, a third output terminal and a fourth output terminal configured to provide respectively a first control signal, a second control signal, a third control signal and a fourth control signal based on a logic operation on the first duty cycle control signal and the second duty cycle control signal, wherein the first control signal, the second control signal, the third control signal and the fourth control signal respectively controls the first switch, the second switch, the third switch and the fourth switch.

3. The voltage converter of claim 2, wherein the logic circuit comprises:
    a logic OR circuit, configured to receive the first duty cycle control signal and the second duty cycle control signal, and to provide the first control signal based on an OR operation on of the first duty cycle control signal and the second duty cycle control signal; and
    a logic NAND circuit, configured to receive an inverting signal which has an opposite phase to the first duty cycle control signal, and the second duty cycle control signal, and to provide the fourth control signal based on an NAND operation on the inverting signal and the second duty cycle control signal.

4. The voltage converter of claim 3, wherein the logic circuit further comprises:
    a first inverting circuit, configured to receive the first control signal, and to provide the second control signal based on the first control signal, wherein the second control signal has an opposite phase to the first control signal; and
    a second inverting circuit, configured to receive the fourth control signal, and to provide the third control signal based on the fourth control signal, wherein the third control signal has an opposite phase to the fourth control signal.

5. The voltage converter of claim 2, wherein the comparison reference signal comprises a current sense signal indicative of a current flowing through the inductor.

6. The voltage converter of claim 5, wherein:
    the first duty cycle regulating circuit comprises:
        a first error amplifier, having a first input terminal configured to receive the first reference signal, a second input terminal configured to receive the first output voltage, and an output terminal configured to provide a first error amplified signal based on the first reference signal and the first output voltage;
        a first comparing circuit, having a first input terminal coupled to the output terminal of the first error amplifier to receive the first error amplified signal, a second input terminal configured to receive the current sense signal, and an output terminal configured to provide a comparison signal based on the comparison of the current sense signal and the first error amplified signal; and
        a flip-flop, having a set terminal configured to receive a clock signal, a reset terminal coupled to the output terminal of the first comparing circuit to receive the comparison signal, and an output terminal configured to provide the first duty cycle control signal based on the clock signal and the comparison signal, wherein the flip-flop is set by the clock signal, and is reset by the comparison signal;
    the second duty cycle regulating circuit comprises:
        a second error amplifier, having a first input terminal configured to receive the second reference signal, a second input terminal configured to receive the absolute signal, and an output terminal configured to provide a second error amplified signal based on the second reference signal and the absolute signal; and
        a second comparing circuit, having a first input terminal coupled to the output terminal of the second error amplifier to receive the second error amplified signal, a second input terminal configured to receive the current sense signal, and an output terminal configured to provide the second duty cycle control signal based on the comparison of the current sense signal and the second error amplified signal.

7. The voltage converter of claim 2, wherein the comparison reference signal comprises a sawtooth signal generated by a sawtooth generator.

8. The voltage converter of claim 7, wherein:
the first duty cycle regulating circuit comprises:
   a first error amplifier, having a first input terminal configured to receive the first reference signal, a second input terminal configured to receive the first output voltage, and an output terminal configured to provide a first error amplified signal based on the first reference signal and the first output voltage; and
   a third comparing circuit, having a first input terminal coupled to the output terminal of the first error amplifier to receive the first error amplified signal, a second input terminal configured to receive the sawtooth signal, and an output terminal configured to provide the first duty cycle control signal based on the comparison of the first error amplified signal and the sawtooth signal;
the second duty cycle regulating circuit comprises:
   a second error amplifier, having a first input terminal configured to receive the second reference signal, a second input terminal configured to receive the absolute signal, and an output terminal configured to provide a second error amplified signal based on the second reference signal and the absolute signal; and
   a fourth comparing circuit, having a first input terminal configured to receive the sawtooth signal, a second input terminal coupled to the output terminal of the second error amplifier to receive the second error amplified signal, and an output terminal configured to provide the second duty cycle control signal based on the comparison of the sawtooth signal and the second error amplified signal.

9. A control circuit for a voltage converter having an inductor, an input port configured to receive an input voltage, a first output port configured to provide a first output voltage, a second output port configured to provide a second output voltage, a first switch coupled between the input port and a first terminal of the inductor, a second switch coupled between the first terminal of the inductor and a second output port, a third switch coupled between a second terminal of the inductor and a first output port, a fourth switch coupled between the second terminal of the inductor and a ground reference, the control circuit comprising:
   a first duty cycle regulating circuit, configured to provide a first duty cycle control signal based on a first reference signal, the first output voltage and a comparison reference signal;
   a second duty cycle regulating circuit, configured to provide a second duty cycle control signal based on a second reference signal, the comparison reference signal and an absolute signal which has an absolute value of the second output voltage; and
   a logic circuit, configured to provide a first control signal, a second control signal, a third control signal and a fourth control signal based on a logic operation on the first duty cycle control signal and the second duty cycle control signal.

10. The control circuit of claim 9, wherein the first control signal, the second control signal, the third control signal and the fourth control signal are adopted to respectively control the first switch, the second switch, the third switch and the fourth switch switched periodically, and wherein each switching period comprises a first time period, a second time period and a third time period, wherein:
   during the first time period, the first switch and the fourth switch are turned on, whereas the second switch and the third switch are turned off;
   during the second time period, the first switch and the third switch are turned on, whereas the second switch and the fourth switch are turned off; and
   during the third time period, the second switch and the fourth switch are turned on, whereas the first switch and the third switch are turned off.

11. The control circuit of claim 9, wherein the logic circuit comprises:
   a logic OR circuit, configured to provide the first control signal based on an OR operation on the first duty cycle control signal and the second duty cycle control signal; and
   a logic NAND circuit, configured to provide the fourth control signal based on an NAND operation on the inverting signal and the second duty cycle control signal.

12. The control circuit of claim 11, wherein the logic circuit further comprises:
   a first inverting circuit, configured to provide the second control signal based on the first control signal, wherein the second control signal has an opposite phase to the first control signal; and
   a second inverting circuit, configured to provide the third control signal based on the fourth control signal, wherein the third control signal has an opposite phase to the fourth control signal.

13. The control circuit of claim 9, wherein the comparison reference signal comprises a current sense signal indicative of a current flowing through the inductor.

14. The voltage converter of claim 13, wherein:
the first duty cycle regulating circuit comprises:
   a first error amplifier, having a first input terminal configured to receive the first reference signal, a second input terminal configured to receive the first output voltage, and an output terminal configured to provide a first error amplified signal based on the first reference signal and the first output voltage;
   a first comparing circuit, having a first input terminal coupled to the output terminal of the first error amplifier to receive the first error amplified signal, a second input terminal configured to receive the current sense signal, and an output terminal configured to provide a comparison signal based on the comparison of the current sense signal and the first error amplified signal; and
   a flip-flop, having a set terminal configured to receive a clock signal, a reset terminal coupled to the output terminal of the first comparing circuit to receive the comparison signal, and an output terminal configured to provide the first duty cycle control signal based on the clock signal and the comparison signal, wherein the flip-flop is set by the clock signal, and is reset by the comparison signal;
the second duty cycle regulating circuit comprises:
   a second error amplifier, having a first input terminal configured to receive the second reference signal, a second input terminal configured to receive the absolute signal, and an output terminal configured to provide a second error amplified signal based on the second reference signal and the absolute signal; and
   a second comparing circuit, having a first input terminal coupled to the output terminal of the second error amplifier to receive the second error amplified signal, a second input terminal configured to receive the current sense signal, and an output terminal configured to provide the second duty cycle control signal based on the comparison of the current sense signal and the second error amplified signal.

15. The voltage converter of claim 9, wherein the comparison reference signal comprises a sawtooth signal generated by a sawtooth generator.

16. The voltage converter of claim 15, wherein:
the first duty cycle regulating circuit comprises:
  a first error amplifier, having a first input terminal configured to receive the first reference signal, a second input terminal configured to receive the first output voltage, and an output terminal configured to provide a first error amplified signal based on the first reference signal and the first output voltage; and
  a third comparing circuit, having a first input terminal coupled to the output terminal of the first error amplifier to receive the first error amplified signal, a second input terminal configured to receive the sawtooth signal, and an output terminal configured to provide the first duty cycle control signal based on the comparison of the first error amplified signal and the sawtooth signal;
the second duty cycle regulating circuit comprises:
  a second error amplifier, having a first input terminal configured to receive the second reference signal, a second input terminal configured to receive the absolute signal, and an output terminal configured to provide a second error amplified signal based on the second reference signal and the absolute signal; and
  a fourth comparing circuit, having a first input terminal configured to receive the sawtooth signal, a second input terminal coupled to the output terminal of the second error amplifier to receive the second error amplified signal, and an output terminal configured to provide the second duty cycle control signal based on the comparison of the sawtooth signal and the second error amplified signal.

17. A method for controlling a voltage converter having an inductor, an input port configured to receive an input voltage, a first output port configured to provide a first output voltage, a second output port configured to provide a second output voltage, a first switch coupled between the input port and a first terminal of the inductor, a second switch coupled between the first terminal of the inductor and the second output port, a third switch coupled between a second terminal of the inductor and the first output port, a fourth switch coupled between the second terminal of the inductor and a ground reference, the method comprising:
  turning on the first switch and the fourth switch, and turning off the second switch and third switch during a first time period;
  turning on the first switch and the third switch, and turning off the second switch and the fourth switch during a second time period, and
  turning on the second switch and the fourth switch, and turning off the first switch and the third switch during a third time period; wherein
    each switching period of the voltage converter comprises the first time period, the second time period and the third time period in a consecutive order.

18. The method of claim 17, further comprising:
generating a first duty cycle control signal based on the first output voltage, a first reference signal and a current sense signal indicative of a current flowing through the inductor;
generating a second duty cycle control signal based on the second output voltage, a second reference signal and the current sense signal; and
controlling lengths of the first time period, the second time period and the third time period based on a logic operation on the first duty cycle control signal and the second duty cycle control signal.

19. The method of claim 17, further comprising:
generating a first duty cycle control signal based on the first output voltage, a first reference signal and a sawtooth signal;
generating a second duty cycle control signal based on the second output voltage, a second reference signal and the sawtooth signal; and
controlling lengths of the first time period, the second time period and the third time period based on a logic operation on the first duty cycle control signal and the second duty cycle control signal.

* * * * *